United States Patent
Vincent

[15] 3,664,251
[45] May 23, 1972

[54] ELECTROMAGNETIC SHUTTER WITH DETENT

[72] Inventor: Andrew W. Vincent, 65 Aberdeen Street, Rochester, N.Y. 14611

[22] Filed: Apr. 1, 1971

[21] Appl. No.: 130,168

Related U.S. Application Data

[62] Division of Ser. No. 816,535, Apr. 16, 1969, Pat. No. 3,595,553.

[52] U.S. Cl. ................................. 95/59, 95/53 E, 335/277
[51] Int. Cl. .......................................................... G03b 9/14
[58] Field of Search ............... 95/53 R, 53 EA, 53 EB, 53 E, 95/59–63; 335/276, 277

[56] References Cited

UNITED STATES PATENTS

| | | | |
|---|---|---|---|
| 3,427,576 | 2/1969 | Vincent | 335/276 |
| 3,470,808 | 10/1969 | Bloemendaal et al. | 95/59 |
| 2,076,191 | 4/1937 | Adams | 95/59 |
| 1,524,081 | 1/1925 | Bornmann | 95/59 |

Primary Examiner—Joseph F. Peters, Jr.
Attorney—Hoffman Stone

[57] ABSTRACT

An electromagnetically actuated photographic shutter including an actuator having a relatively uniform output force characteristic, and a shock absorbing stop consisting of a member having an inclined abutment surface in the path of travel of the body to be stopped. The abutment surface is inclined relative to the direction of travel of the body, and is resiliently movable in a direction generally normal to the direction of travel and fixed against motion in the direction of travel. The abutment surface is preferably covered with a pad of a compressible material having a relatively high coefficient of friction. When the moving body strikes the abutment surface it drives the stop laterally, and energy is dissipated by compression of the compressible material and friction. In the shutter, the blades are mounted on beams that are shaped to engage the stop.

3 Claims, 2 Drawing Figures

Patented May 23, 1972

3,664,251

INVENTOR.
ANDREW W. VINCENT

ATTORNEY

3,664,251

ELECTROMAGNETIC SHUTTER WITH DETENT

BRIEF SUMMARY

This application is a division of my co-pending application, Ser. No. 816,535, filed Apr. 16, 1969, and now U.S. Pat. No. 3,595,553.

This invention relates to a novel photographic shutter including a novel shock absorbing stop arrangement especially suited for equipment of light weight and capable of stopping a moving body smoothly and accurately and without "bounce."

Heretofore, remotely controlled electrically actuated camera shutters of the kind including electromagnetic actuators for driving the shutter blades have been relatively bulky and of limited capability, especially in regard to speed of operation.

Briefly, the present invention contemplates, in the first instance, a camera shutter having blades driven directly by an electromagnetic actuator, and of relatively simple, rugged, and long lasting construction, with a high degree of dependability and high speed capability. The arrangement features the use of an electromagnetic actuator of the type described and claimed in U.S. Pat. No. 3,427,576, which is characterized by a relatively uniform output force throughout its operating range.

The second feature of the invention pertains to a shock absorbing detent arrangement, which arrests the shutter blades at the ends of their travels quickly, smoothly, without bounce, and without damage to any of the operating parts of the shutter. In accordance with the invention, the detent arrangement includes a spring-mounted stop member rigidly fixed against motion in the direction of travel of the shutter blades and resiliently movable in a direction normal to the travel. The stop carries inclined abutment surfaces, which engage inclined surfaces on the beams that mount the shutter blades. The inclined surfaces on the stop are covered with a resilient material such as sheet rubber, preferably of the synthetic type, which has a high coefficient of friction. When the beam strikes one of the inclined surfaces, it drives the stop member in its movable direction, normal to the path of travel of the beam, sliding along the surface of the compressible sheet material, and also compressing it. The beam, with the shutter blade, is stopped very rapidly, yet softly and without damage. After it stops, it is driven back to a position close to the point at which it first contacted the stop member, where it comes to rest. There is no bounce, and with proper design and selection of the compressible material, there is no sticking. When the shutter is next urged in the return direction, it is not retarded to any significant extent by the stop member.

DETAILED DESCRIPTION

Figure 1:
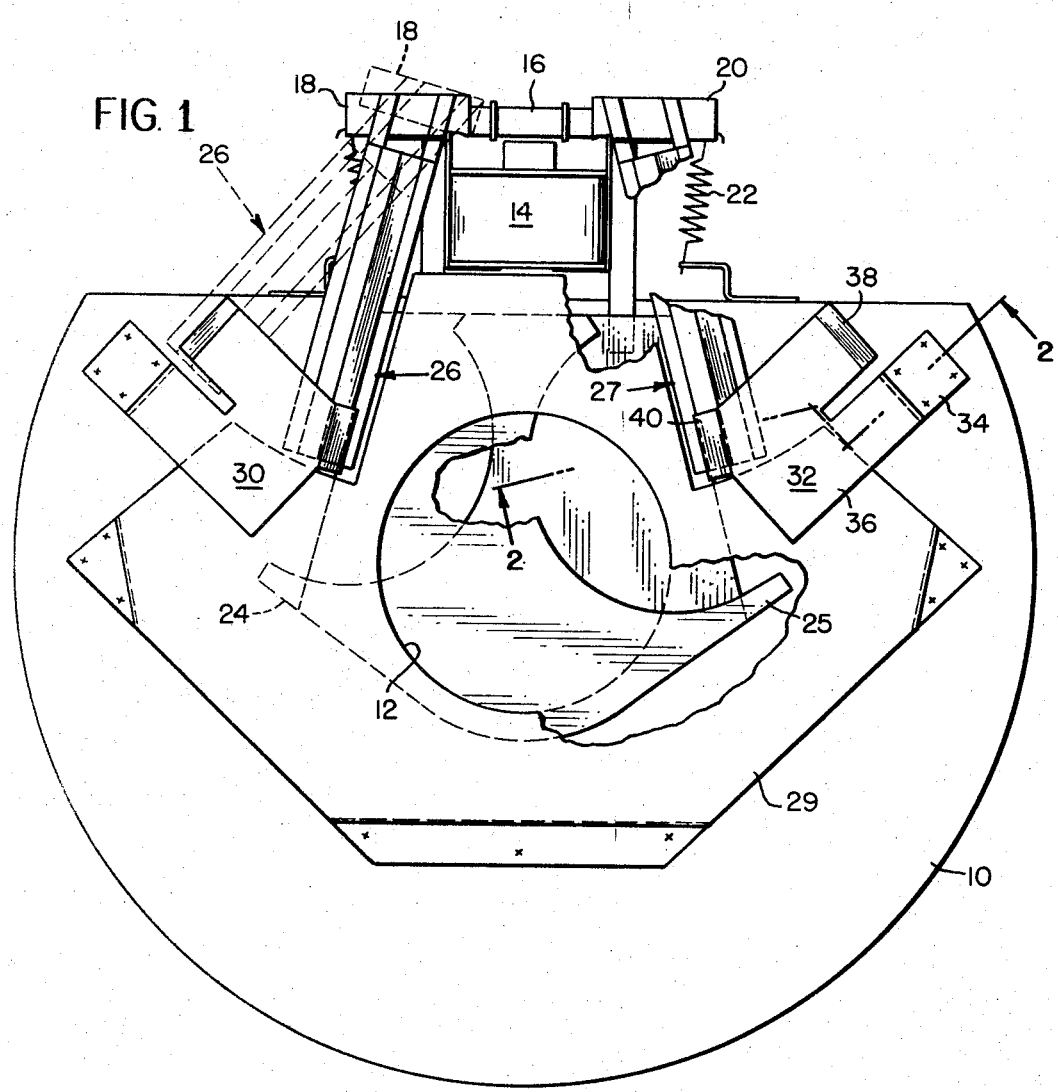
Figure 2:
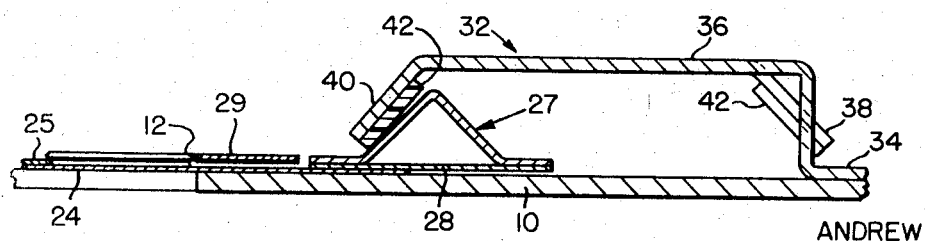

A representative embodiment of the invention will now be described in greater detail in conjunction with the accompanying drawing, wherein:

FIG. 1 is a front elevational view, with parts broken away, of a photographic shutter according to the invention including two shock absorbing detents; and FIG. 2 is a cross sectional view taken along the line 2—2 of FIG. 1.

As shown, the shutter according to the invention includes a base mounting plate 10 having a central aperture 12, which in use may define the optical stop of the camera. An electromagnetic actuator 14 of the type hereinabove referred to is fixed upon one edge of the plate 10 for driving the shutter mechanism. The actuator 14 includes an armature 16, which works against a pair of levers 18 and 20, respectively. The levers 18 and 20 ride on floating pivots (not separately designated) and rotate in a direction parallel to the plane of the plate 10. Return springs 22 bias the outer ends of the levers 18 and 20 downwardly as viewed in the drawing. When the actuator is energized, the armature 16 drives the levers 18 and 20 to move their outer ends upwardly. As viewed in FIG. 1, the left hand lever 18 moves in a clockwise direction when the actuator 14 is energized, and the right hand lever moves counter clockwise.

The shutter blades 24 and 25, respectively, are fixed at the lower ends of respective beams 26 and 27, the upper ends of which are rigidly secured to the levers 18 and 20, respectively. The beams 26 and 27 are of relatively thin sheet material and of triangular cross section, each having a base plate 28 (FIG. 2) to which the shutter blade 24 or 25 is rigidly secured. The shutter blades 24 and 25 ride upon the mounting plate 10 and are preferably coated with a film of a low friction material such as, for example, polytetrafluoroethylene (not shown in the drawing) to minimize frictional loading.

The shutter blades 24 and 25 and the beams 26 and 27 are made of very thin sheet metal to minimize the mass that must move during operation of the shutter. To enable the achievement of fast action with a high degree of reliability and accuracy, the shutter blades 24 and 25 must be stopped quickly, smoothly, and without bounce. The shock absorbing detents 30 and 32, shown, accomplish this. The detents 30 and 32 are of similar construction except that they are of opposite respective hand. The description, therefore, of only the right hand detent 32 need be given here. It is essentially a formed plate of resilient sheet metal such as stainless steel having a projecting and offset tab portion 34 spot welded or otherwise rigidly secured to the base mounting plate 10. A U-shaped spring portion 36 extends from the offset tab 34 generally parallel to and spaced from the mounting plate 10 sufficiently far to clear the beam 27. An "advance" stopping surface 38 is formed by bending down the end of the U adjacent to the mounting tab 34. A second stop 40 for arresting the beam as it approaches the closed position of the shutter is formed by bending down a base portion of the U. The stop surfaces 38 and 40 are arranged so that they are substantially parallel to the beam when the beam meets them.

As shown, the upper surface of the beam 27 is of triangular cross section, each side lying at about 45° from the plane of the mounting plate 10. The stop surfaces 38 and 40 may also be formed at the same angle, but it has been found that better results are achieved, particularly with respect to durability, if the stop surfaces 38 and 40 are made slightly steeper, say angularly spaced about 50° from the plane of the mounting plate 10.

Sheets 42 of a synthetic rubbery material such as polyurethane are secured along the abutment surfaces of the stop portions 38 and 40. The sheets 42 are preferably of a material that has a relatively high coefficient of friction. A coefficient of about 0.4 has been found in actual ractice to provide excellent results.

A cover sheet 29 is fixed to the main plate 10 and extends over the blades 24 and 25 to protect and guide them.

In operation, when the beam strikes one of the stop surfaces 38 or 40, it forces the plate 36 upwardly, that is, away from the mounting plate 10, with a camming action. Simultaneously, it compresses the polyurethane strip 42, and the strip 42 rides up (as viewed in FIG. 2) the inclined surface of the beam 27. After the beam stops, the detent returns almost to its initial position, driving the beam back, but not throwing it out of contact with the sheet material 42.

Optimum operation of the shock absorbing detent of the invention depends in large measure upon achieving a proper balance between the total mass to be stopped and its energy, on the one hand, and the resilience of the spring constituted by the plate 36, and the thickness, compressibility, and frictional characteristics of the strip of compressible material 42 in which the energy is dissipated. These latter factors must be adjusted in view of the mass and velocity of the moving body to avoid bounce and any tendency to stick. If the slope of the abutment surface 38 or 40 is made substantially equal to the slope of the top of the beam 26 or 27, there seems to be a tendency for the compressible sheet 42 to creep up over the apex of the beam after a large number of operations and thereby to cause the beam to stick, and slowing the start of its return travel. It is preferred, therefore, to incline the stop surfaces 38 and 40 at a slightly steeper angle so that the beam first engages the outermost edge of the compressible sheet 42 and comes into full engagement against the sheet 42 only after the outermost portion has been slightly compressed. An angle of about 5° between the abutment portions 38 and 40 and the engaging surfaces of the beam 26 or 27 has been found to provide satisfactory operation over a long service life. Tests have shown no appreciable wear or deterioration after 7,000,000 operating cycles of the shutter.

Operating speeds as high as 0.002 second exposure time have been achieved in an actual shutter similar to the one shown in the drawing having an opening 12, 1 inch in diameter. Higher speeds are achievable with smaller openings, and in all cases, control of exposure times may be done electrically with a high degree of precision simply by timing the periods for which the actuator 14 is energized. Also, the motion of the shutter blades is exceedingly rapid. They can be made to move through their full range of travel in about 0.001 second. If desired, an auxiliary iris diaphragm may be secured to the mounting plate 10 for independent control of the optical aperture. It is also possible to cause the shutter blades themselves to function as a diaphragm. Since the output force of the actuator 14 is substantially uniform throughout its travel, the excursion of the shutter blades is proportional to the electrical energization of the actuator. The effective opening of the shutter, therefore, may be controlled by electrically adjusting the amplitude of the current applied to the actuator to energize it.

What is claimed is:

1. An electromagnetically operatable camera shutter comprising:
   a. a rigid mounting plate having an aperture,
   b. an electromagnetic actuator including an output lever pivoted for reciprocating rotation in a direction parallel to the plane of said plate,
   c. a beam fixed to said lever and extending parallel to said plate to a location adjacent to said aperture,
   d. a shutter blade fixed to said beam near the end thereof opposite from said lever, said blade extending over said aperture when said lever is at one end of its travel, and being withdrawn from said aperture when said lever is at the opposite end of its travel, and
   e. a detent mounted on said plate for arresting said beam at the ends of its motion and absorbing shock therefrom.

2. An electromagnetically operatable camera shutter according to claim 1 wherein said actuator is characterized by a substantially uniform output force over its range of motion.

3. An electromagnetically operatable camera shutter according to claim 1 wherein said beam is of hollow construction and includes an outer surface inclined at about 45° to said mounting plate, and said detent includes an abutment surface generally parallel to said outer surface for engagement by it at one end of the travel of said beam, and means mounting said abutment surface resiliently yieldable normal to said plate.

* * * * *